US012770428B2

(12) United States Patent
Bu et al.

(10) Patent No.: US 12,770,428 B2
(45) Date of Patent: Oct. 20, 2026

(54) ADJUSTMENT OF PIXELS

(71) Applicants: Hewlett-Packard Development Company, L.P., Spring, TX (US); Purdue Research Foundation, West Lafayette, IN (US)

(72) Inventors: Fan Bu, West Lafayette, IN (US); Zhuosheng Zhang, Palo Alto, CA (US); Qian Lin, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 236 days.

(21) Appl. No.: 18/699,826

(22) PCT Filed: Oct. 13, 2021

(86) PCT No.: PCT/US2021/054704

§ 371 (c)(1),
(2) Date: Apr. 9, 2024

(87) PCT Pub. No.: WO2023/063938

PCT Pub. Date: Apr. 20, 2023

(65) Prior Publication Data

US 2024/0412557 A1 Dec. 12, 2024

(51) Int. Cl.

| | |
|---|---|
| ***G06V 40/16*** | (2022.01) |
| ***G06T 5/20*** | (2006.01) |
| ***G06V 10/25*** | (2022.01) |
| ***G06V 10/60*** | (2022.01) |
| ***G06V 10/75*** | (2022.01) |
| ***H04N 1/40*** | (2006.01) |

(52) U.S. Cl.

CPC .............. *G06V 40/161* (2022.01); *G06T 5/20* (2013.01); *G06V 10/25* (2022.01); *G06V 10/60* (2022.01); *G06V 10/751* (2022.01); *H04N 1/40012* (2013.01); *G06V 2201/07* (2022.01)

(58) Field of Classification Search

CPC ...... G06V 40/161; G06V 10/25; G06V 10/60; G06V 10/751; G06V 2201/07; G06T 5/20; H04N 1/40012; G09G 3/3406; G09G 2320/0686; G09G 2354/00; G09G 5/10

USPC .......................................................... 382/118

See application file for complete search history.

(56) References Cited

U.S. PATENT DOCUMENTS

| | | | | |
|---|---|---|---|---|
| 10,096,122 B1 * | 10/2018 | Agrawal | .................. | G06T 7/90 |
| 10,360,876 B1 * | 7/2019 | Rahman | .................. | G09G 5/14 |
| 2008/0018571 A1 * | 1/2008 | Feng | .................... | G09G 3/3648 345/87 |
| 2009/0109232 A1 | 4/2009 | Kerofsky | | |

(Continued)

FOREIGN PATENT DOCUMENTS

RU 2463673 C2 10/2012

*Primary Examiner* — Ping Y Hsieh
*Assistant Examiner* — Heath E. Wells
(74) *Attorney, Agent, or Firm* — Quarles & Brady LLP

(57) ABSTRACT

In some examples, a controller can include a processing resource and a memory resource storing instructions to cause the processing resource perform object detection on a frame of a plurality of frames of a video signal, generate a bounding box around an object in the frame in response to the object detection detecting the object in the frame, perform a backlight adjustment of the frame, and generate an output frame having adjusted pixel values for each pixel from the backlight adjustment.

15 Claims, 3 Drawing Sheets

(56) References Cited

U.S. PATENT DOCUMENTS

| | | | | |
|---|---|---|---|---|
| 2009/0322915 | A1* | 12/2009 | Cutler | H04N 23/611 348/251 |
| 2010/0039414 | A1 | 2/2010 | Bell | |
| 2012/0106790 | A1 | 5/2012 | Sultana et al. | |
| 2012/0188265 | A1 | 7/2012 | Suzuki | |
| 2015/0130958 | A1* | 5/2015 | Pavani | H04N 23/88 348/217.1 |
| 2021/0183020 | A1* | 6/2021 | Gollanapalli | G06T 9/002 |
| 2021/0193058 | A1 | 6/2021 | Lee et al. | |
| 2022/0270556 | A1* | 8/2022 | Neumeier | G09G 3/3225 |
| 2023/0063309 | A1* | 3/2023 | Liu | G06V 40/171 |

* cited by examiner

ADJUSTMENT OF PIXELS

BACKGROUND

Computing devices can allow a user to utilize computing device operations for work, education, gaming, multimedia, and/or other uses. Computing devices can be portable to allow a user to carry or otherwise bring the computing device with while in a mobile setting. A computing device can allow a user to utilize computing device operations for work, education, gaming, multimedia, and/or other general use in a mobile setting.

DETAILED DESCRIPTION

Figure 1:
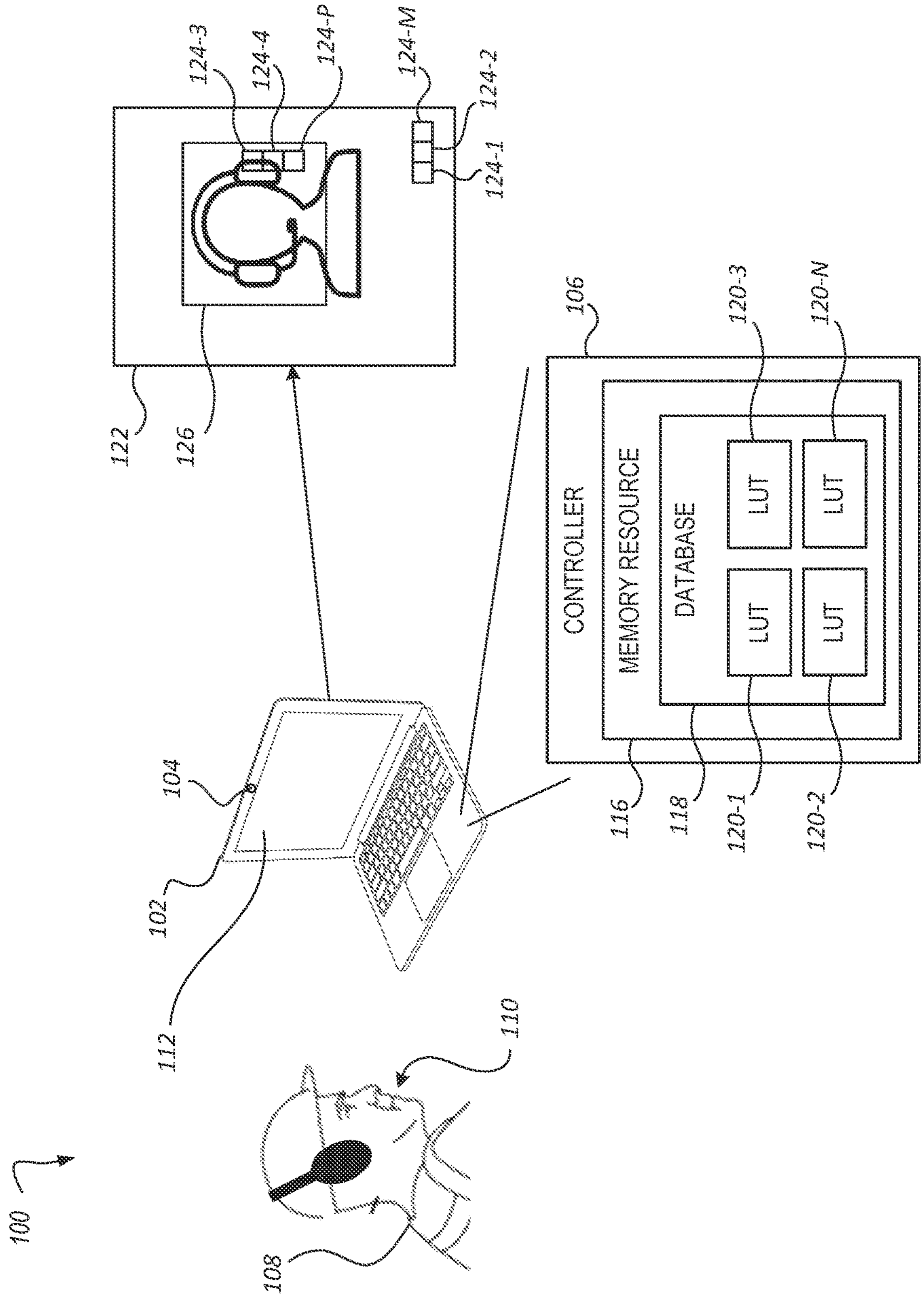
FIG. 1 is an example of a system for adjustment of pixels consistent with the disclosure.

A user may utilize a computing device for various purposes, such as for business and/or recreational use. As used herein, the term "computing device" refers to an electronic system having a processor resource and a memory resource. Examples of computing devices can include, for instance, a laptop computer, a notebook computer, an all-in-one (AIO) computer, among other types of computing devices.

A user may utilize the computing device in conjunction with an image capture device, such as a camera. As used herein, the term "camera" refers to an optical device that captures a visual image. The camera can be, for instance a video camera, which can be used for electronic motion picture acquisition. The camera may be integrated within the computing device and/or be a peripheral device connected to the computing device.

The camera can capture successive images for motion picture acquisition. For example, a user may utilize the camera for a video conference. In such a video conference, the user may be a subject in the captured video, which may be broadcast to other participants in the video conference.

The camera may be utilized by users in different spaces, which can have varying lighting conditions. For example, a first user may utilize the camera in a room near a window, resulting in an excess amount of light being captured by the camera. A second user may utilize the camera in a dark room with low-lighting conditions, resulting in not enough light being captured by the camera.

When lighting conditions are not ideal (e.g., too much light, or not enough light) in the space in which the camera is being used, the resulting output video quality may be lower than that of a space having ideal lighting conditions. For instance, in the example of the low-lighting condition space, the video and/or the subject in the video may be dark and not easily visible. In the example of the too much light being captured by the camera, the subject still may not be easily visible as the video may be too bright. As a result, the subject may not look natural in color and/or contrast, especially a face of the subject in the video. Therefore, it can be beneficial to correct the video captured by the camera when the lighting in a space in which the camera is used is too bright or too dim.

Previous approaches included a user manually choosing a method to modify pixel brightness. As used herein, the term "pixel" refers to a smallest controllable element of a picture represented on a display. For example, the user had to manually select methods so as to modify the brightness of pixels. Such approaches include local area contrast and brightness enhancement methods. In such local area contrast and brightness enhancement methods, an input image is divided into partitions based on a luminosity range of those partitions and then enhanced by local contrast curves. The partitions are then merged into a single output image. However, such an approach may not produce consistent results, especially across cameras having different dynamic ranges. For example, when choosing a fixed universal parameter for the local contrast curves (e.g., by the user), such curves may not produce consistent results for cameras having different dynamic ranges. Additionally, large amounts of computational power have to be used if different universal parameters for the local contrast curves are chosen based on analysis of different input images as they are received. As such, either approach (manual selection or real-time analysis of different input images) has drawbacks when considering use during real-time video (e.g., video conferencing, etc.).

Other past approaches include deep learning methods. For example, image-to-image deep neural networks may be utilized to enhance image quality of input images. However, such approaches have to use large amounts of processing power and are not typically useful when considering use during real-time video (e.g., video conferencing, etc.).

Adjustment of pixels according to the disclosure can allow for adjustment of pixels in frames from a real-time video signal to handle different and complex lighting conditions for different subjects across different cameras. Such an approach can use less processing power than previous approaches while providing automatic and precise pixel adjustments for any pixel in a frame of the video signal, no matter the particular lighting conditions in which the camera is operating. Accordingly, adjustment of pixels according to the disclosure can allow the subject in a video to appear more natural in color and/or contrast, which may allow for better communication quality and more effective communication and engagement, as compared with previous approaches.

FIG. 1 is an example of a system 100 for adjustment of pixels consistent with the disclosure. The system 100 can include a computing device 102. The computing device 102 can include a camera 104 and a controller 106.

As illustrated in FIG. 1, a subject 108 may utilize the computing device 102. For example, the subject 108 may utilize the camera 104 of the computing device 102 for a video conference. During the video conference, the camera 104 can capture successive images of the subject 108 for broadcast to other attendees of the video conference.

In such an example (e.g., or any other example in which the camera 104 captures successive images for broadcast/display), lighting conditions may cause the display of the captured successive images to be too bright, too dark, etc., and can cause the subject 108 to be correspondingly too bright, too dark, etc. In addition, in certain instances, the background area behind the subject 108 may be of a sufficient brightness, but the lighting in the space in which the computing device 102 is located in may cause the face 110 of the subject to be too light, too dark, etc. Accordingly, adjustment of pixels according to the disclosure can allow for adjustments to the video signal to correct for such lighting imbalances, as is further described herein.

As illustrated in FIG. 1, the controller 106 can include a database 118. As used herein, the term “database” refers to an organized collection of data stored and accessed electronically via a computing system. For example, as illustrated in FIG. 1, the database 118 can include a collection of data including a plurality of lookup tables (LUTs) 120-1, 120-2, 120-3, 120-N (referred to collectively herein as LUTs 120). As used herein, the term “LUT” refers to an array of data to map an input value to an output value. For example, the LUTs 120 can receive an input value and generate an output value for pixel adjustment, as is further described herein.

Although the database 118 is illustrated in FIG. 1 as being included in the memory resource 116 of the controller 106, examples of the disclosure are not so limited. For example, the database 118 can be located remotely from the controller 106 (e.g., on a remote computing device) and may be accessed, by the controller 106, via a wired or wireless network relationship.

The controller 106 is to generate the LUTs 120 upon initialization of the video signal. For example, the subject 108 may launch an application or program utilizing the camera 104 (e.g., a web conferencing application) via the computing device 102, and upon launch of such an application, a video signal from the camera 104 may be initialized. Upon such an occurrence, the controller 106 generates the LUTs 120, as is further described herein.

Each LUT 120 can be a two-dimensional (2D) LUT generated using a local area contrast/brightness enhancement method with different pre-defined parameters suitable for different dynamic ranges. Such parameters can include lighting prototype curves with shadow masks, contrast enhancement prototype curves with midtone masks, and darkening prototype curves with highlight masks. Each of the prototype curves are one-dimensional (1D) mapping functions that can be used to adjust a raw image pixel value in a certain manner. A blurred pixel value is used to calculate the masks for each respective curve. A weighted sum function is used to blend the adjusted pixel values from the curves and masks to determine each LUT. Such steps are performed for all possible raw image pixel values and blurred pixel values, and can generate 256 curves to comprise a LUT 120.

Such steps are performed by the controller 106 in order to generate the LUTs 120 stored in the database 118. Accordingly, the LUTs 120 can be 2D LUTs (e.g., as mentioned above) that can receive two inputs (a raw image pixel value and a blurred pixel value) and generate an output pixel value. Such a mapping function can be described by Equation 1 below:

$$y = LUT(x, m) \quad \text{Equation 1}$$

where y is the output pixel value, LUT is a lookup table function having inputs of x and m, where x is the raw image pixel value and m is the blurred pixel value. As used herein, the term “pixel value” refers to a number (or set of numbers) describing how bright a pixel is and/or what color it should be. The raw image pixel value refers to an unmodified pixel value of a pixel having information captured by the camera 104. The blurred pixel value refers to a pixel value of a pixel having information captured by the camera 104 that has been modified by converting the pixel to a gray image and filtered by a Gaussian kernel.

As illustrated in FIG. 1, the database 118 includes four LUTs 120. However, examples of the disclosure are not so limited. For example, the database 118 may include more than four LUTs 120 or less than four LUTs 120. For instance, the controller 106 may generate thirteen LUTs 120 (e.g., the controller 106 generates thirteen LUTs 120) in order to have LUTs 120 suitable for images across different luminosity ranges.

As mentioned above, the camera 104 captures successive images that can be utilized to generate a video. Each of the successive images can be referred to as frames. As used herein, the term “frame” refers to an individual still image that, when viewed in sequence with other successive still images, comprise a video. For example, during the video conference, the camera 104 captures a plurality of frames that include the subject 108 that when viewed in sequence comprise a video. Each frame (e.g., frame 122) can include a plurality of pixels (e.g., pixels 124-1, 124-2, 124-M, 124-3, 124-4, 124-P, referred to collectively herein as pixels 124), as is further described herein.

The controller 106 is to perform object detection on a frame 122 of the plurality of frames of the video signal. As used herein, the term “object detection” refers to detection of objects from a video. Performing object detection may include performing facial recognition on the frame 122. For example, the controller 106 is to perform facial recognition on the frame 122 to determine whether there is a face 110 of the subject 108 in the frame 122. As used herein, the term “facial detection” refers to a computing method to identify a human face in a digital image. For example, the controller 106 can execute deep learning, support vector machine (SVM), or any other machine-learning or other facial recognition methods to identify the face 110 of the subject 108 in the frame 122.

In some examples, the controller 106 is to perform facial recognition on each frame 122 of the video signal. However, examples of the disclosure are not so limited. For instance, in some examples, the controller 106 is to perform the facial recognition at a particular frequency based on a predetermined number of frames of the video signal that are received. For example, the controller 106 is to perform the facial recognition once every ten frames received from the video signal. Such an approach can reduce processing resources used by the controller 106 to perform the facial recognition and increase processing speed of the facial recognition as a result.

In response to the object detection detecting the object in the frame 122 (e.g., detection of the face 110 of the subject 108), the controller 106 generates a bounding box 126 around the object. As used herein, the term “bounding box” refers to a shape that is a point of reference defining a position of an object. For example, the controller 106 generates the bounding box 126 around the face of the subject 108 on the frame 122 to define a position of the object in the frame 122. Additionally, the bounding box 126 may define a position of groups of pixels 124. For example, the pixels 124-1, 124-2, 124-M may be pixels located outside of the bounding box 126, and pixels 124-3, 124-4, and 124-P may be pixels located inside of the bounding box 126.

The controller 106 is to determine a pixel value of the pixels 124-3, 124-4, 124-P included in the bounding box 126. Although not shown in FIG. 1 for clarity, the bounding box 126 can include more than three pixels 124-3, 124-4, 124-P. The controller 106 determines the raw image value of the pixels 124-3, 124-4, 124-P by determining each value of each channel of each pixel. For example, the frame 122 can be a red, green, and blue (RGB) image where each pixel has an RGB value (e.g., a value in a range between 0 and 255). For example, the controller 106 determines that pixel 124-3 includes raw image RGB values of x=[25, 15, 20] (e.g., where variable "x" is represented as the raw image pixel value in Equation 1 above). The controller 106 can determine the raw image RGB values of each pixel 124-3, 124-4, 124-P included in the bounding box 126.

The controller 106 is to further determine a pixel value of the remaining pixels 124-1, 124-2, 124-M (e.g., the remaining pixels outside of the bounding box 126). Similar to the pixels included in the bounding box 126, although not shown in FIG. 1 for clarity, the frame 122 can include more than three pixels 124-1, 124-2, 124-M. The controller 106 determines the raw image value of the pixels 124-1, 124-2, 124-M by determining each raw pixel RGB value of each channel of each pixel. The controller 106 determines an overall pixel value of the pixels 124 using the pixel value of the pixels 124-3, 124-4, 124-P and the pixels 124-1, 124-2, 124-M.

The controller 106 further generates a blurred value for each of the pixels 124 included in the frame 122. To generate a blurred value, the controller 106 converts each pixel 124 from the RGB color space to grayscale. The controller 106 then applies a Gaussian filter to each pixel 124 to generate a blurred value (e.g., represented by variable "m" in Equation 1 above) for each pixel 124. The blurred value m can be a value between 0 and 255.

In some examples, the controller 106 performs a low-light adjustment in response to the raw image pixel values of the pixels 124 being less than a threshold pixel value. For instance, the camera 104 may be operating in a space which is dark. As a result, the pixel values of the pixels 124 may be lower than an example in which the camera 104 is operating in a space with more light. Accordingly, the controller 106 can perform the low-light adjustment prior to performing the backlight adjustment, as is further described herein.

If the controller 106 detects the face 110 of the user 108 in the frame 122, the controller 106 determines whether the average pixel value of the pixels 124-1, 124-2, 124-M and 124-3, 124-4, 124-P (e.g., the average pixel value of the entire frame 122) is less than a first threshold value; if yes, then the controller 106 determines the image is too dark and determines that the controller 106 should perform the low-light adjustment to the raw image pixel values of the pixels 124 of the frame 122. If the average pixel value of the entire frame 122 is greater than a second threshold value, then the controller determines that a low-light adjustment is not to be performed and refrains from performing such adjustment and proceeds to determining whether to perform a backlight adjustment (e.g., as is further described herein).

If the controller 106 does not detect the face 110 of the user 108 in the frame 122, the controller 106 again checks whether the face 110 of the user 108 is detected in the frame at a predetermined frequency interval (e.g., every two seconds). If the controller 106 then detects the face 110 of the user 108 in the frame at the predetermined frequency interval, the controller 106 determines that the low-light adjustment is not to be performed and refrains from performing such adjustment and proceeds to determining whether to perform a backlight adjustment (e.g., as is further described herein). If the controller does not detect the face 110 of the user 108 in the frame at the predetermined frequency interval, the controller 106 determines whether the average pixel value is less than a third threshold value; if yes, then the controller 106 determines the image is too dark and determines that the controller 106 should perform the low-light adjustment to the raw image pixel values of the pixels 124 of the frame 122. If the average pixel value of the entire frame 122 is not less than the third threshold, the controller 106 determines whether the average pixel value of the entire frame 122 is greater than the second threshold value. If the average pixel value of the entire frame 122 is greater than the second threshold value, then the controller determines that a low-light adjustment is not to be performed and refrains from performing such adjustment and proceeds to determining whether to perform a backlight adjustment (e.g., as is further described herein).

In order to perform the low-light adjustment, the controller 106 selects an LUT from the LUTs 120. LUT 120-1 may be, for example, a low-light adjustment LUT. Accordingly, the controller 106 selects LUT 120-1 from the LUTs 120. Selection of a particular LUT from the LUTs 120 can be performed according to Equation 2, as is further described below.

Utilizing the determined raw image pixel values determined above, the controller 106 compares a pixel value (e.g., raw image pixel value "x") and a blur value (e.g., blurred pixel value "m") of each pixel 124 included in the frame 122 to the LUT 120-1. That is, the controller provides, as inputs to LUT 120-1, the pixel value and the blur value of each pixel 124 in the frame 122. Since the LUT 120-1 is a 2D LUT, the LUT 120-1 can receive the two input values and generate an output. The output can be a low-light adjusted pixel value (e.g., represented by variable "y" in Equation 1 above). For example, suppose the raw image pixel value of pixel 124-3 is x=[25, 15, 20] and its blurred value is determined to be 22 (e.g., m=22). The blurred value 22 dictates which curve from the LUT 120-1 to select (e.g., out of 256 curves comprising the LUT 120-1). Based on the selected curve and the raw image pixel value, the LUT 120-1 brightens the value of pixel 124-3, resulting in an output (e.g., "y"), where the output is a low-light adjusted pixel value. The low-light adjusted pixel value can be, for instance, y=[45, 36, 41] (which is brighter than the input raw image pixel value of x=[25, 15, 20]). This process can be repeated for all of the pixels 124 in the frame 122.

As a result of the low-light adjustments of the pixels 124, the controller 106 generates an intermediate frame. The intermediate frame includes the low-light adjusted pixel values for each of the pixels 124 in the intermediate frame. In the example in which the controller 106 performs the low-light adjustment, the backlight adjustment (e.g., as is further described herein) is applied to the intermediate frame having the low-light adjusted pixel values for each of the pixels 124.

Although the controller 106 is described above as performing a low-light adjustment to the pixels 124, examples of the disclosure are not so limited. For example, if the raw image pixel values of the pixels 124 are not less than a threshold pixel value, the controller 106 does not perform the low-light adjustment to pixels 124. Rather, the controller is to perform a backlight adjustment to the frame 122 (e.g., to the pixels 124), as is further described herein.

The controller 106 is to perform a backlight adjustment of the frame 122 (or the intermediate frame if a low-light adjustment is performed). As previously mentioned above, the database 118 includes pre-generated LUTs 120. The controller 106 can select an LUT 120 from the LUTs 120 in the database 118 based on the pixel value of the pixels 124-3, 124-4, 124-P included in the bounding box 126. For example, the controller 106 selects LUT 120-2 from the LUTs 120 for the backlight adjustment. Determination of which LUT 120 is selected based on the pixel values is further described herein.

The controller 106 can select an LUT from the LUTs 120 based on an average pixel value of the bounding box 126. For example, the controller 106 may determine an average pixel value of the pixels 124-3, 124-4, 124-P included in the bounding box 126. Utilizing the average pixel value, the controller 106 can select an LUT using Equation 2 below:

$$LUT_i \text{ where } i = \begin{cases} 0, & \text{brightness}_{avg} \leq 5 \\ 25 - \dfrac{\text{brightness}_{avg} - 5}{10}, & \text{brightness}_{avg} > 125 \\ \dfrac{\text{brightness}_{avg} - 5}{10}, & \text{brightness}_{avg} < 125 \end{cases} \quad \text{Equation 2}$$

where i represents a number of an LUT indexed from 0 to N (e.g., LUTs 120-1, 120-2, 120-3, 120-N as illustrated in the database 118 of FIG. 1), and $\text{brightness}_{avg}$ represents the average pixel value of the pixels 124-3, 124-4, 124-P included in the bounding box 126. For example, the controller 106 selects LUT 120-2 (e.g., i=2) based on the average pixel value of the pixels 124-3, 124-4, 124-P.

Similar to the low-light adjustment, the controller 106 utilizes the determined raw image pixel values determined above and compares a pixel value (e.g., raw image pixel value "x", or in the case of a low-light adjustment the low-light adjusted pixel value) and a blur value (e.g., blurred pixel value "m") of each pixel 124 included in the frame 122 to the selected LUT 120-2. That is, the controller provides, as inputs to LUT 120-2, the raw image pixel value (or the low-light adjusted pixel value) and the blur value of each pixel 124 in the frame 122. Since the LUT 120-2 is a 2D LUT, the LUT 120-2 can receive the two input values and generate an output. The output can be a backlight adjusted pixel value (e.g., represented by variable "y" in Equation 1 above). For example, suppose the raw image pixel value of pixel 124-1 is x=[48, 38, 44] and its blurred value is determined to be 22 (e.g., m=22). The blurred value 22 dictates which curve from the LUT 120-2 to select (e.g., out of 256 curves comprising the LUT 120-2). Based on the selected curve and the raw image pixel value (or the low-light adjusted pixel value), the LUT 120-2 brightens the value of pixel 124-1, resulting in an output (e.g., "y"), where the output is a backlight adjusted pixel value. The backlight adjusted pixel value can be, for instance, y=[56, 42, 51] (which is brighter than the input pixel value of x=[48, 38, 44]). This process can be repeated for all of the pixels 124 in the frame 122 to set an adjusted pixel value (e.g., a backlight adjusted pixel value) for each pixel of the pixels 124 in the frame based on the comparison.

As a result of the backlight adjustments of the pixels 124, the controller 106 generates an output frame having the adjusted pixel values for each pixel 124. The output frame includes the backlight adjusted pixel values for each of the pixels 124 in the intermediate frame. The output frame can be displayed on a display 112 of the computing device 102, and/or on other displays (e.g., such as displays of computing devices associated with other attendees of a video conference). Such an output frame can include the adjusted pixel values so that the subject 108 and/or the face 110 of the subject 108 looks natural in color and/or contrast.

The process detailed above can be performed (e.g., iterated) for each successive frame in the source video. Such an approach can result in a displayed video having adjusted pixel values that allow the video to appear more natural in color and/or contrast.

As successive frames are received, lighting conditions in the space may change. For example, more or less light may enter into a space into which the camera 104 is operating. Accordingly, the LUT 120 utilized to perform the backlight adjustment (e.g., to generate adjusted pixel values) may be changed, as is further described herein.

As frames are received by the source video, the controller 106 can classify the frames by type. For example, the controller 106 can determine whether a particular frame that is received is a transition frame or a non-transition frame, as is further described herein. Determination of the frame type can allow the controller 106 to determine when to select a different LUT 120, as is further described herein.

Transition frames can occur based on a particular frequency based on a predetermined number of frames that are received. For example, every 20 frames may be marked as transition frames, and after every 20 frames, the controller 106 may receive a non-transition frame, in response to which the controller 106 may perform a pixel value determination and select a different LUT, as is further described herein.

For example, the controller 106 determines whether the frame 122 is a transition frame. In response to the frame 122 being a transition frame, the controller 106 continues to utilize the LUT 120-2.

In an instance in which the frame 122 is not a transition frame, the controller 106 is to perform facial recognition (e.g., as described above), as well as determine the raw image pixel values of the pixels 124 of the frame 122 (e.g., as described above). Since the raw image pixel values of the pixels 124 may change (e.g., as more or less light enters a space in which camera 104 is operating), the controller 106 may select a new LUT 120-3. The controller 106 determines whether LUT 120-3 is the same LUT as the previous LUT (e.g., LUT 120-2). In response to the selected LUT 120-3 being a different LUT than the previous LUT (e.g., LUT 120-2), the controller 106 utilizes the new LUT 120-3 for the backlight adjustment and marks the next predetermined number of frames (e.g., the next twenty frames) that are received as being transition frames, and the new LUT 120-3 is utilized for backlight adjustment for the next twenty frames.

In an example in which the controller 106 selects LUT 120-2 as the new LUT, the controller 106 determines that the newly selected LUT 120-2 is the same LUT as the previously selected LUT (e.g., LUT 120-2). In such a case, the controller continues to utilize the LUT 120-2 for backlight adjustment. Such an instance may occur when the lighting level in the space in which the camera 104 is operating does not change within twenty frames.

Determining which LUT 120 to select based on the method described above can allow for the controller 106 to gradually adjust pixel values in successive frames. Such an approach can prevent stark changes in adjusted pixel values that may be noticeable to the subject 108 or other users (e.g., or attendees of a video conference).

Adjustment of pixels according to the disclosure can allow for a controller to adjust, in real-time, frames from a video signal in order to display the video, and/or a subject in said video, in a more natural color and/or contrast. By utilizing pre-generated LUTs, less processing power is used as compared with previous approaches, preventing the use of large processing capability (e.g., and high cost) video graphics cards to perform such adjustment. Additionally, by using the pre-generated LUTs, such an approach can be utilized for many different cameras having different dynamic ranges. The automatic LUT selection process can also provide for backlight adjustment as lighting conditions may change, allowing for gradual changes in backlight adjustment that users may not notice, allowing for a better, more streamlined, and automatic user experience as compared with previous approaches.

Figure 2:
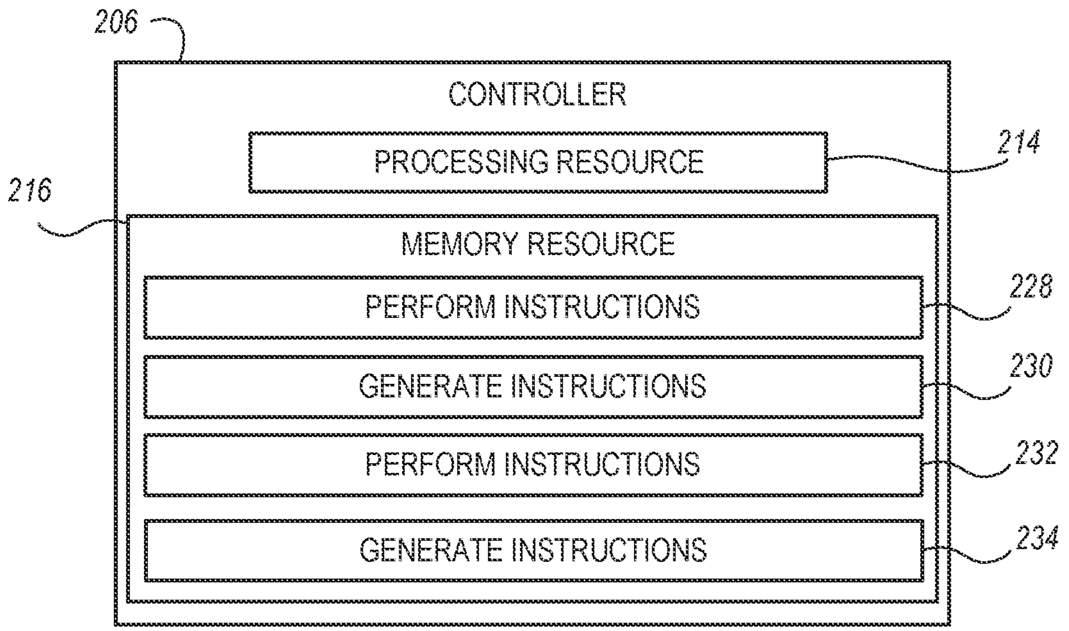
FIG. 2 is an example of a controller for adjustment of pixels consistent with the disclosure.

FIG. 2 is an example of a controller 206 for adjustment of pixels consistent with the disclosure. As described herein, the controller 206 may perform functions related to adjustment of pixels. Although not illustrated in FIG. 2, the controller 206 may include a processor and a machine-readable storage medium. Although the following descriptions refer to a single processor and a single machine-readable storage medium, the descriptions may also apply to a system with multiple processors and multiple machine-readable storage mediums. In such examples, the controller 206 may be distributed across multiple machine-readable storage mediums and across multiple processors. Put another way, the instructions executed by the controller 206 may be stored across multiple machine-readable storage mediums and executed across multiple processors, such as in a distributed or virtual computing environment.

Processing resource 214 may be a central processing unit (CPU), a semiconductor-based microprocessor, and/or other hardware devices suitable for retrieval and execution of machine-readable instructions 228, 230, 232, 234 stored in a memory resource 216. Processing resource 214 may fetch, decode, and execute instructions 228, 230, 232, 234. As an alternative or in addition to retrieving and executing instructions 228, 230, 232, 234, processing resource 214 may include a plurality of electronic circuits that include electronic components for performing the functionality of instructions 228, 230, 232, 234.

Memory resource 216 may be any electronic, magnetic, optical, or other physical storage device that stores executable instructions 228, 230, 232, 234, and/or data. Thus, memory resource 216 may be, for example, Random Access Memory (RAM), an Electrically-Erasable Programmable Read-Only Memory (EEPROM), a storage drive, an optical disc, and the like. Memory resource 216 may be disposed within controller 206, as shown in FIG. 2. Additionally, memory resource 216 may be a portable, external or remote storage medium, for example, that causes controller 206 to download the instructions 228, 230, 232, 234 from the portable/external/remote storage medium.

The controller 206 may include instructions 228 stored in the memory resource 216 and executable by the processing resource 214 to perform object detection on a frame of a plurality of frames of a video signal. The video signal can be received by the controller 206 from a video camera. Object detection can include, for example, facial recognition in order to recognize a face of a subject included in a frame from the video signal.

The controller 206 may include instructions 230 stored in the memory resource 216 and executable by the processing resource 214 to generate a bounding box around an object in the frame in response to the object detection detecting the object in the frame. For example, the controller 206 may detect a face of a subject in the frame, and generate a bounding box around the face of the subject.

The controller 206 may include instructions 232 stored in the memory resource 216 and executable by the processing resource 214 to perform a backlight adjustment of the frame. Performing a backlight adjustment of the frame can include comparing a pixel value (e.g., a raw image pixel value in an example in which no low-light adjustment is made to the frame, or a low-light adjusted pixel value in an example in which a low-light adjustment is made to the frame) and a blur value of each pixel of the plurality of pixels in the frame to a database. The database can include a plurality of LUTs. As such, the controller 206 inputs the pixel value and the blur value of each pixel of the plurality of pixels in the frame into a particular LUT which generates an adjusted pixel value for each pixel of the plurality of pixels in the frame. Next, the controller 206 sets the adjusted pixel value for each pixel of the plurality of pixels included in the frame based on the comparison (e.g., based on the output value from the particular LUT).

The controller 206 may include instructions 234 stored in the memory resource 216 and executable by the processing resource 214 to generate an output frame having the adjusted pixel values for each pixel. The output frame may be displayed on a display of a computing device.

Figure 3:
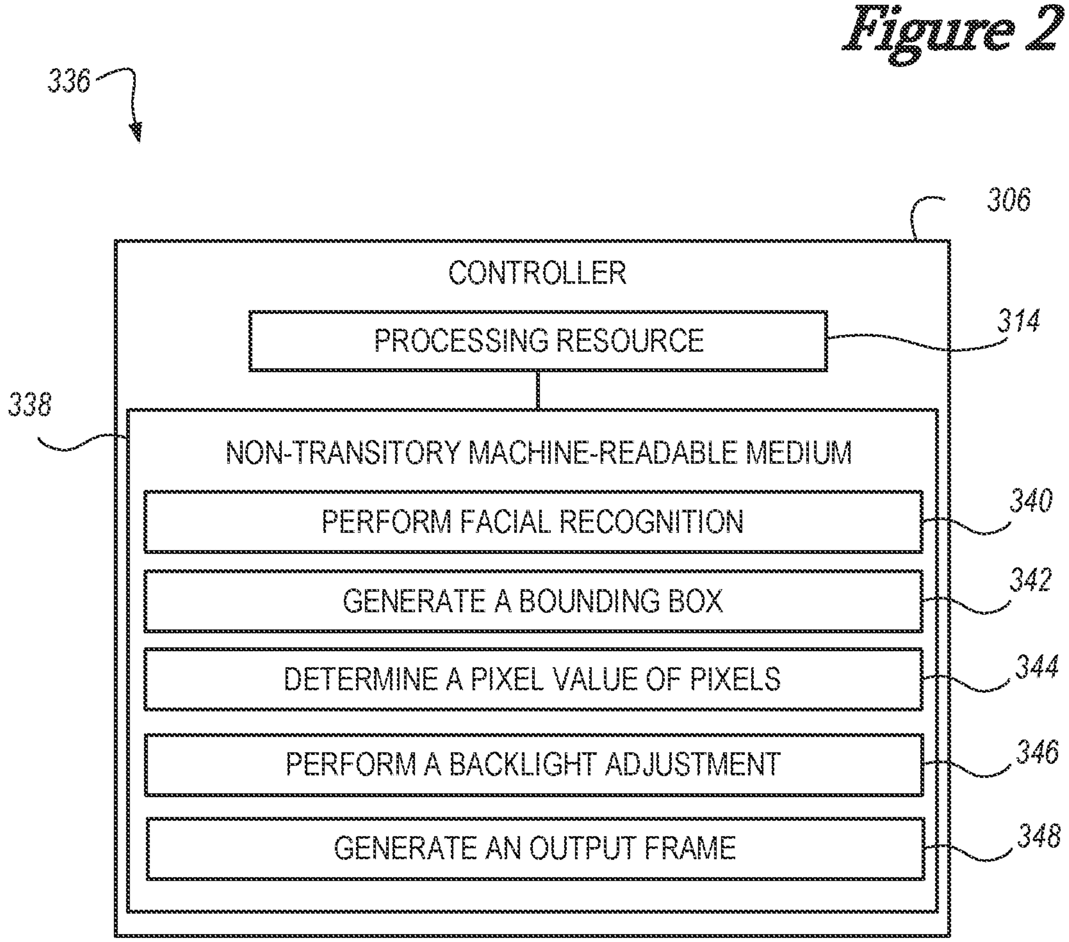
FIG. 3 is a block diagram of an example system for adjustment of pixels consistent with the disclosure.

FIG. 3 is a block diagram of an example system 336 for adjustment of pixels consistent with the disclosure. In the example of FIG. 3, system 336 includes a controller 306 including a processing resource 314 and a non-transitory machine-readable storage medium 338. Although the following descriptions refer to a single processing resource and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processing resource 314 may be a central processing unit (CPU), microprocessor, and/or other hardware device suitable for retrieval and execution of instructions stored in the non-transitory machine-readable storage medium 338. In the particular example shown in FIG. 3, processing resource 314 may receive, determine, and send instructions 340, 342, 344, 346, 348. As an alternative or in addition to retrieving and executing instructions, processing resource 314 may include an electronic circuit comprising a number of electronic components for performing the operations of the instructions in the non-transitory machine-readable storage medium 338. With respect to the executable instruction representations or boxes described and shown herein, it should be understood that part or all of the executable instructions and/or electronic circuits included within one box may be included in a different box shown in the figures or in a different box not shown.

The non-transitory machine-readable storage medium 338 may be any electronic, magnetic, optical, or other physical storage device that stores executable instructions. Thus, non-transitory machine-readable storage medium 338 may be, for example, Random Access Memory (RAM), an Electrically-Erasable Programmable Read-Only Memory (EEPROM), a storage drive, an optical disc, and the like. The executable instructions may be "installed" on the system 336 illustrated in FIG. 3. Non-transitory machine-readable storage medium 338 may be a portable, external or remote storage medium, for example, that allows the system 336 to download the instructions from the portable/external/remote storage medium. In this situation, the executable instructions may be part of an "installation package".

Perform facial recognition instructions 340, when executed by a processor such as processing resource 314, may cause system 336 to perform facial recognition on a frame of a plurality of frames of a video signal to determine whether there is a face of a subject in the frame.

Generate a bounding box instructions 342, when executed by a processor such as processing resource 314, may cause system 336 to generate a bounding box around the face in the frame in response to the facial recognition detecting the face in the frame. The frame can include a plurality of pixels.

Determine a pixel value of pixels instructions 344, when executed by a processor such as processing resource 314, may cause system 336 to determine a pixel value of pixels included in the bounding box and an overall pixel value of the plurality of pixels. The pixel values can be raw image pixel values.

Perform a backlight adjustment instructions 346, when executed by a processor such as processing resource 314, may cause system 336 to perform a backlight adjustment of the frame. Performing a backlight adjustment of the frame can include selecting a LUT from a plurality of pre-generated LUTs based on the pixel value of the pixels in the bounding box and the overall pixel value of the plurality of pixels. Further, performing the backlight adjustment includes comparing a pixel value (e.g., a raw image pixel value in an example in which no low-light adjustment is made to the frame, or a low-light adjusted pixel value in an example in which a low-light adjustment is made to the frame) and a blur value of each pixel of the plurality of pixels in the frame to the selected LUT. That is, the controller 306 inputs the pixel value and the blur value of each pixel of the plurality of pixels in the frame into the selected LUT which generates an adjusted pixel value for each pixel of the plurality of pixels in the frame. Next, the controller 306 sets the adjusted pixel value for each pixel of the plurality of pixels included in the frame based on the comparison (e.g., based on the output value from the particular LUT).

Generate an output frame instructions 348, when executed by a processor such as processing resource 314, may cause system 336 to generate an output frame having the adjusted pixel values for each pixel. The output frame may be displayed on a display of a computing device.

Figure 4:
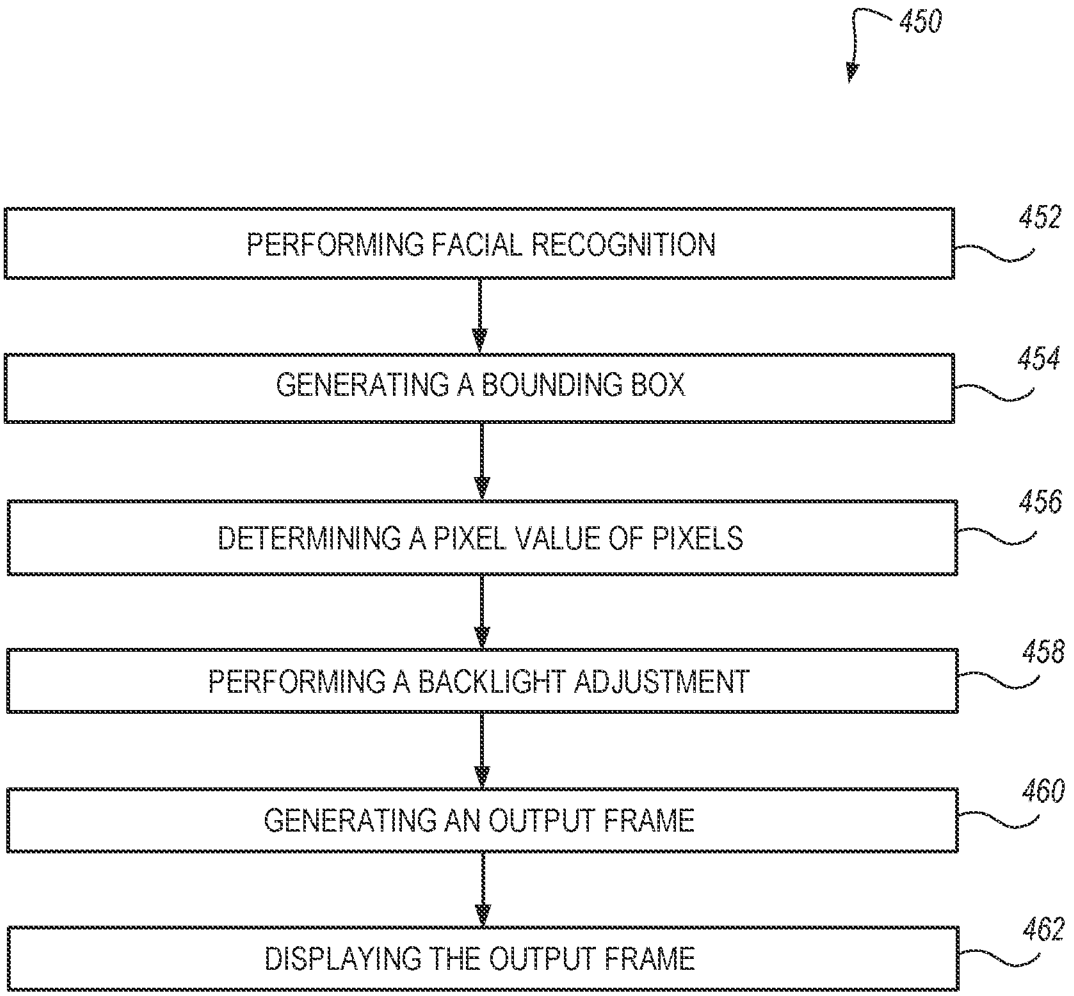
FIG. 4 is an example of a method for adjustment of pixels consistent with the disclosure.

FIG. 4 is an example of a method 450 for adjustment of pixels consistent with the disclosure. The method 450 can be performed by a controller (e.g., controller 106, 206, 306, previously described in connection with FIGS. 1, 2, and 3, respectively).

At 452, the method 450 includes performing, by a controller, facial recognition on a frame of a plurality of frames of a video signal to determine whether there is a face of a subject in the frame. The video signal can be received by the controller from a video camera.

At 454, the method 450 includes generating, by the controller, a bounding box around the face in the frame in response to the facial recognition detecting the face in the frame. The frame can include a plurality of pixels.

At 456, the method 450 includes determining, by the controller, a pixel value of pixels included in the bounding box and an overall pixel value of the plurality of pixels. The pixel values can be raw image pixel values.

At 458, the method 450 includes performing, by the controller, a backlight adjustment of the frame. Performing a backlight adjustment of the frame can include selecting a first LUT from a plurality of pre-generated LUTs based on the pixel value of the pixels in the bounding box and the overall pixel value of the plurality of pixels. Further, performing the backlight adjustment includes comparing a pixel value (e.g., a raw image pixel value in an example in which no low-light adjustment is made to the frame, or a low-light adjusted pixel value in an example in which a low-light adjustment is made to the frame) and a blur value of each pixel of the plurality of pixels in the frame to the first LUT. That is, the controller inputs the pixel value and the blur value of each pixel of the plurality of pixels in the frame into the first LUT which generates an adjusted pixel value for each pixel of the plurality of pixels in the frame. Next, the controller sets the adjusted pixel value for each pixel of the plurality of pixels included in the frame based on the comparison (e.g., based on the output value from the first LUT).

At 460, the method 450 includes generating, by the controller, an output frame having the adjusted pixel values for each pixel.

At 462, the method 450 includes displaying, by a display, the output frame.

The method 450 may be repeated for each frame that is received by the controller from the video signal. Further, the controller may select a second LUT from the plurality of pre-generated LUTs as lighting conditions may change, which can cause a change in the raw image pixel values included in the frames from the received video signal.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 106 may refer to element 106 in FIG. 1 and an analogous element may be identified by reference numeral 206 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A controller, comprising:

a processor; and a memory storing non-transitory machine-readable instructions to cause the processor to:

generate a plurality of pre-generated lookup tables (LUTs) upon initialization of a video signal, wherein each of the plurality of pre-generated LUTs corresponds to possible raw image pixel value and blurred pixel value combinations;

perform object detection on a frame of a plurality of frames of the video signal;

generate a bounding box around an object in the frame in response to the object detection detecting the object in the frame;

perform a backlight adjustment of the frame by:

comparing a pixel value and a blur value of each pixel of a plurality of pixels included in the frame to a database including the plurality of pre-generated LUTs; and setting an adjusted pixel value for each pixel of the plurality of the pixels included in the frame based on the comparison; and generate an output frame having the adjusted pixel values for each pixel.

2. The controller of claim 1, wherein:

the memory includes instructions to cause the processor to select a LUT from the plurality of pre-generated LUTs based on a pixel value of pixels included in the bounding box and an overall pixel value of the plurality of pixels included in the frame.

3. The controller of claim 1, wherein performing the object detection includes performing facial recognition on the frame to determine whether there is a face of a subject in the frame.

4. The controller of claim 3, including instructions to cause the processor to perform the facial recognition at a particular frequency based on a predetermined number of frames of the video signal that are received.

5. The controller of claim 1, including instructions to cause the processor to determine the blur value of each pixel by:

converting each pixel of the plurality of pixels from a red, green, and blue (RGB) color space to grayscale, wherein the pixel value is an RGB value; and apply a Gaussian filter to each pixel of the plurality of pixels.

6. The controller of claim 1, including instructions to cause the processor to further perform a low-light adjustment of the frame in response to the plurality of pixels being less than a threshold pixel value.

7. A non-transitory machine-readable storage medium including instructions that when executed cause a processing resource to:

generate a plurality of pre-generated lookup tables (LUTs) upon initialization of a video signal, wherein each of the plurality of pre-generated LUTs corresponds to possible raw image pixel value and blurred pixel value combinations;

perform facial recognition on a frame of a plurality of frames of a video signal to determine whether there is a face of a subject in the frame;

generate a bounding box around the face in the frame in response to the facial recognition detecting the face in the frame, wherein the frame includes a plurality of pixels;

determine a pixel value of pixels included in the bounding box and an overall pixel value of the plurality of pixels;

perform a backlight adjustment of the frame by:

selecting a lookup table (LUT) from the plurality of pre-generated LUTs based on the pixel value of the pixels in the bounding box and the overall pixel value of the plurality of pixels;

comparing the pixel value and a blur value of each pixel of the plurality of pixels to the selected LUT; and setting an adjusted pixel value for each pixel of the plurality of the pixels included in the frame based on the selected LUT; and generate an output frame having the adjusted pixel values for each pixel.

8. The non-transitory storage medium of claim 7, including instructions to perform a low-light adjustment of the frame in response to the pixel value of the plurality of pixels being less than a threshold value.

9. The non-transitory storage medium of claim 8, wherein performing the low-light adjustment includes instructions to:

select a different LUT from the plurality of LUTs;

compare the pixel value and a blur value of each pixel of a plurality of pixels included in the frame to the different LUT; and set a low-light adjusted pixel value for each pixel of the plurality of the pixels included in the frame based on the different LUT.

10. The non-transitory storage medium of claim 9, including instructions to:

generate an intermediate frame having the low-light adjusted pixel values for each pixel of the plurality of pixels in the frame; and perform the backlight adjustment on the intermediate frame.

11. A method, comprising:

generate, by the controller, a plurality of pre-generated lookup tables (LUTs) upon initialization of a video signal, wherein each of the plurality of pre-generated LUTs corresponds to possible raw image pixel value and blurred pixel value combinations;

performing, by the controller, facial recognition on a frame of a plurality of frames of a video signal to determine whether there is a face of a subject in the frame;

generating, by the controller, a bounding box around the face in the frame in response to the facial recognition detecting the face in the frame, wherein the frame includes a plurality of pixels;

determining, by the controller, a pixel value of pixels included in the bounding box and an overall pixel value of the plurality of pixels;

performing, by the controller, a backlight adjustment of the frame by:

selecting a first lookup table (LUT) from the plurality of pre-generated LUTs based on the pixel value of the pixels in the bounding box and the overall pixel value of the plurality of pixels;

comparing the pixel value and a blur value of each pixel of the plurality of pixels to the first LUT; and setting an adjusted pixel value for each pixel of the plurality of the pixels included in the frame based on the first LUT;

generating, by the controller, an output frame having the adjusted pixel values for each pixel; and displaying, by a display, the output frame.

12. The method of claim 11, wherein the method further includes determining, by the controller, whether the frame is a transition frame.

13. The method of claim 12, wherein in response to the frame being a transition frame, the method includes utilizing the first LUT.

14. The method of claim 12, where in response to the frame not being a transition frame, the method includes:

selecting, by the controller, a second LUT;

determining, by the controller, that the second LUT is a different LUT as the first LUT; and in response to the second LUT being the different LUT from the first LUT:

utilizing, by the controller, the second LUT for the backlight adjustment; and marking, by the controller, a next predetermined number of frames of the video signal to be received as transition frames.

15. The method of claim 12, where in response to the frame not being a transition frame, the method includes:

selecting, by the controller, a second LUT;

determining, by the controller, that the second LUT is a same LUT as the first LUT;

utilizing, by the controller in response to the second LUT being the same LUT as the first LUT, the first LUT for the backlight adjustment.

* * * * *